(12) United States Patent
Hu et al.

(10) Patent No.: US 12,445,710 B2
(45) Date of Patent: Oct. 14, 2025

(54) SHOOTING METHOD AND CAMERA BASED ON MULTI-CAMERA LINKAGE

(71) Applicant: NETVUE TECHNOLOGIES CO., LTD., Shenzhen (CN)

(72) Inventors: Youle Hu, Shenzhen (CN); Chuan Chen, Shenzhen (CN); Rui Zhang, Shenzhen (CN); Yucheng Ren, Shenzhen (CN)

(73) Assignee: NETVUE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/900,419

(22) Filed: Sep. 27, 2024

(65) Prior Publication Data
US 2025/0274649 A1    Aug. 28, 2025

(30) Foreign Application Priority Data
Feb. 28, 2024 (CN) .......................... 202410222831.7

(51) Int. Cl.
*H04N 23/611*     (2023.01)
*G06T 7/20*     (2017.01)
*H04N 23/69*     (2023.01)
*H04N 23/695*     (2023.01)

(52) U.S. Cl.
CPC ............. *H04N 23/611* (2023.01); *G06T 7/20* (2013.01); *H04N 23/69* (2023.01); *H04N 23/695* (2023.01)

(58) Field of Classification Search
CPC .... H04N 23/611; H04N 23/69; H04N 23/695; G06T 7/20
USPC ......................................................... 382/103
See application file for complete search history.

(56) References Cited

U.S. PATENT DOCUMENTS

| | | | |
|---|---|---|---|
| 2008/0089552 A1* | 4/2008 | Nakamura | H04N 21/835 375/E7.009 |
| 2010/0141767 A1* | 6/2010 | Mohanty | G08B 13/19643 348/E5.024 |
| 2021/0365707 A1* | 11/2021 | Mao | G06V 10/25 |

\* cited by examiner

*Primary Examiner* — Stephen P Coleman

(57) ABSTRACT

The present invention belongs to the field of shooting, and provides a shooting method and camera based on multi-camera linkage. The first camera is a fixed wide-angle camera, and tracks and acquires the position of the shooting target in real time. The image processing technology is used to analyze the composition quality and determines an optimal second camera shooting position coordinate. The control module sends a rotation instruction to enable the second camera to track the shooting target in real time, so as to ensure that the shooting target keeps the center position in the close-up image. When it is analyzed that the shooting target occupies the proper proportion and angle in the picture, the second camera is started to track and shoot, and during shooting, the second camera is zoomed and rotated according to the position of the shooting target, so that better image shooting is achieved.

4 Claims, 6 Drawing Sheets

The control module issues the rotation tracking shooting instruction to the second camera position

↓

The second camera position determines the position of the shooting target based on the close-up shooting composition analyzed and calculated by the recognition module, and rotation tracking and zoom shooting

↓

The control module issues other rotation instructions to the second camera position to achieve photographing diversification

Fig. 6

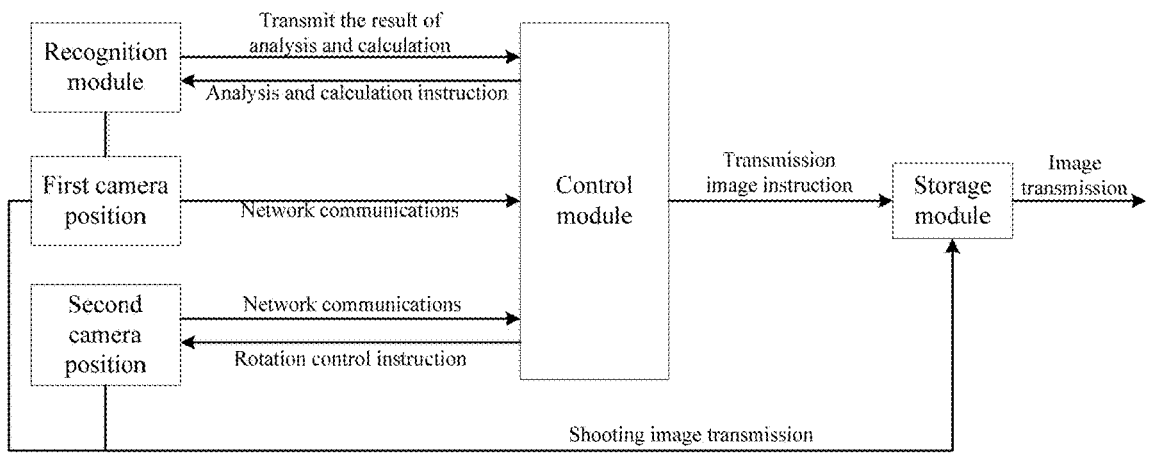

Fig. 7

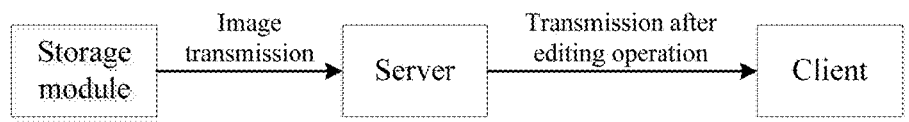

Fig. 8

SHOOTING METHOD AND CAMERA BASED ON MULTI-CAMERA LINKAGE

CROSS-REFERENCE TO RELATED APPLICATIONS

The application claims priority of Chinese patent application CN 2024102228317, filed on Feb. 28, 2024, which is incorporated herein by reference in its entireties.

TECHNICAL FIELD

The present invention relates to the field of shooting technology, in particular to a shooting method and camera based on multi-camera linkage.

BACKGROUND

At present, most of the methods of observing animals are accomplished by watching the animal images captured by the filming equipment, and generally a fixed camera position or the photographer manually changes the shooting orientation to track the shooting target, and the images of the animals captured are based on the fixed shooting area of the fixed camera position or the photographer rotates the shooting orientation of the camera according to his own judgment to realize it, but these shooting methods and the cameras used for shooting have the following problems:

(1) in the shooting target scheme of fixed camera position, the position of the shooting target in the image can be changed all the time, and it is not possible to shoot with the shooting target as the center, and the background area in the picture is not adjustable, so there will be problems such as the proportion of the shooting target is too low, the background proportion is too large, and the angle of the shooting target is not appropriate;

(2) in the shooting target mode that the camera position can be rotated, whether the camera is used for shooting by using a bracket or the photographer holding the camera, it is necessary to manually judge the next more appropriate shooting orientation to rotate the image field of view of the camera, and the anti-shake performance during rotation may be poor, which affects the quality of the shooting target image;

(3) It is necessary to judge the shooting task artificially, and when a suitable shooting image appears, the shooting target image may not be photographed in time, or the photographer can only squat and shoot the target activity to shoot the desired shooting target image, which increases the workload of the photographer and makes it difficult to shoot the image of the sudden appearance of the shooting target activity in time.

Therefore, we need to develop a shooting method and camera based on multi-camera linkage, which can automatically identify and track the shooting composition and target shooting image with good shooting effect in the image of the wide-angle camera by combining the advantages of fixed camera position and rotatable position to automatically capture the target image.

SUMMARY

The present invention aims to provide a shooting method and camera based on multi-camera linkage to solve the problem that the existing shooting method mentioned in the above-mentioned background art and the target image composition taken by the camera are not beautiful, it takes a lot of manpower and time, etc.

In order to achieve the above purpose, the present invention adopts the following technical scheme:

according to an aspect of the present invention, a shooting method based on multi-camera linkage is provided, and the method comprises:

acquiring a first camera position image through a first camera position, tracking and acquiring a position of a shooting target in the first camera position image in real time;

based on the position of the shooting target, a close-up shooting composition of the shooting target is analyzed and calculated through image processing technology to obtain close-up shooting image coordinates of a second camera position;

based on the close-up shooting image coordinates, the second camera position carries out real-time tracking and shooting of the shooting target, and obtains a close-up shooting image of the shooting target.

Further, the second camera position carries out real-time tracking shooting of the shooting target, and a control module issues a tracking instruction to the second camera position based on the close-up shooting image coordinates, and the tracking instruction tracks the close-up shooting image coordinates in real time.

Further, position information of the shooting target in the first camera position image is position coordinate of the shooting target in the coordinate system of the first camera position image.

Further, the image processing technology comprises an optical flow algorithm.

Further, the close-up shooting composition of the shooting target is analyzed and calculated, comprising:

determining the proportion of the shooting target in the close-up shooting composition of the shooting target, if the proportion of the shooting target is within a first preset threshold range, setting the close-up shooting image coordinates of the second camera position based on a range of the close-up shooting composition of the shooting target.

Further, if the proportion of the shooting target is not within the first preset threshold range, determine whether the proportion of the shooting target is within a second preset threshold range, and if the proportion of the shooting target is within the second preset threshold range, set the coordinates of the close-up shooting image of the second camera position based on the range of the close-up shooting composition of the shooting target.

Further, the second preset threshold range comprises the first preset threshold range.

Further, before determining the proportion of the shooting target in the close-up shooting composition of the shooting target, the shooting target needs to be determined the position and angle of the shooting target in the close-up shooting composition, including:

if the position of the shooting target in the close-up shooting composition of the shooting target is within a first preset area, then determining whether the angle of the shooting target in the close-up shooting composition of the shooting target is within a first preset angle range, and if so, carrying out the determining the proportion of the shooting target in the close-up shooting composition of the shooting target.

Further, the first preset angle range comprises the angle at which the shooting target is facing the first camera position.

Further, the close-up shooting image coordinates specifically comprise: an edge position coordinates of the close-up shooting image of the second camera position, and the position coordinates of the shooting target in the close-up shooting image of the second camera position.

Further, the second camera position includes zoom and/or rotation shooting when carrying out real-time tracking and shooting on the shooting target, and can rotate in different forms to shoot diversified effects.

According to one aspect of the present invention, a camera based on multi-camera linkage is provided, comprising:

- a first camera position is a fixed wide-angle camera position, which is used to find a shooting frame of a shooting target;
- a second camera position is a rotatable camera position, which is used to track close-up shooting of the shooting target;
- a control module for controlling the camera position rotation of the second camera position;
- a recognition module for determining close-up shooting image coordinates and rotation orientation of the second camera position based on image processing technology.

Further, a storage module for storing images captured by the first camera position and the second camera position, and transmitting the images.

It can be seen from the above technical scheme that the present invention has at least the following advantages and positive effects compared with the prior art:

(1) In addition to fixed the wide-angle camera position, that is, the first camera position, the second camera is used to shoot the shooting target, the shooting target position information is captured in combination with the wide-angle range of the first camera, the shooting target is shot carefully by the second camera position, and it is guaranteed that the shot image includes the composition image mainly taking the shooting target;

(2) the first camera position and the second camera position are combined on the whole photographing device, and according to the image processing algorithm, the second camera position automatically rotates based on the position of the shooting target in the first camera position image, tracking and shooting the shooting target, reducing the burden of the photographer, and the photographed image picture being clear and stable;

(3) based on the image processing technology, the composition quality of the image suitable for the close-up shooting range of the second camera can be automatically judged, and when the shot object, that is, the shooting target, appears in the first camera image, if it is analyzed that the image composition of the position part of the shooting target meets the shooting requirement, the shooting target is automatically rotated to track and shoot the shooting target, the position of the shooting target in the close-up shooting image of the second camera is automatically adjusted, whether the image of the current shooting target is suitable for second camera close-up shooting or not does not need to be manually judged, and more automation and intelligence are achieved.

BRIEF DESCRIPTION OF THE DRAWINGS

In order to more clearly illustrate the specific embodiment of the present invention or the technical solution in the prior art, the accompanying drawings that need to be used in the specific embodiment or prior art description will be briefly described below. In all drawings, similar elements or parts are generally identified by similar drawing markings. In the drawings, individual components or parts are not necessarily drawn to actual scale.

FIG. 6 shows a flowchart of the second camera zoom rotation photographing according to the embodiment;

FIG. 7 shows a schematic structural diagram of a camera based on multi-camera linkage according to the embodiment;

FIG. 8 shows a schematic structural diagram of image editing and transmission of the shooting target according to the embodiment.

EMBODIMENTS

In order to explain the objectives, technical solutions, and advantages of the present disclosure more clearly, the technical solutions in the embodiments of the present disclosure will be clearly and completely described below with reference to the accompanying drawings in the embodiments of the present disclosure; obviously, the described embodiments are only part of the embodiments of the present invention, not all embodiments, and the embodiments can be implemented in various forms, and should not be understood as limited to the embodiments described herein; rather, these embodiments are provided so that the present invention will be more comprehensive and complete, and will fully convey the concepts of the exemplary embodiments to those skilled in the art.

Furthermore, the described features, structures, or characteristics may be combined in any suitable manner in one or more embodiments. In the following description, numerous specific details are provided to give a thorough understanding of embodiments of the present invention. Those skilled in the art will appreciate, however, that the technical solutions of the present invention may be practiced without one or more of the specific details, or other methods, components, means, steps, and the like may be employed. In other instances, well-known methods, apparatuses, implementations, or operations are not shown or described in detail to avoid obscuring aspects of the present invention.

The block diagrams shown in the accompanying drawings are merely functional entities and do not necessarily correspond to physically independent entities. That is, these functional entities may be implemented in the form of software, or implemented in one or more hardware modules or integrated circuits, or implemented in different networks and/or processor devices and/or microcontroller devices.

The flowcharts shown in the accompanying drawings are merely exemplary descriptions, do not necessarily include all content and operations/steps, and are not necessarily performed in the described order. For example, some operations/steps may also be decomposed, and the operations/steps may be combined or partially combined, so the actual execution order may be changed according to actual situations.

The present invention will be described in detail below with reference to specific embodiments:

Embodiment 1

Figure 1:
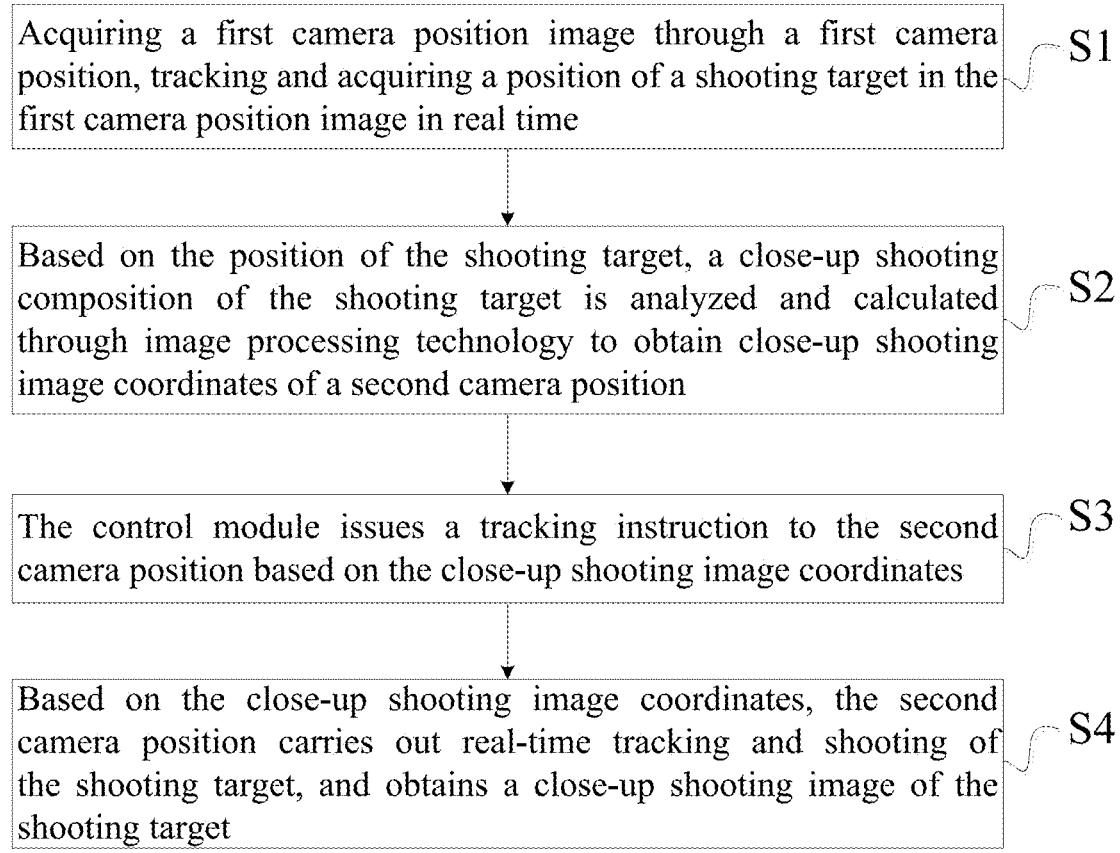
FIG. 1 shows a flowchart of a shooting method based on multi-camera linkage according to the embodiment.

As shown in FIG. 1, the embodiment of the present invention provides a shooting method based on multi-camera linkage, wherein the setting of camera position is not limited to the first camera position and the second camera position, and the first camera position can be a gun-type camera, the second camera position can be a dome camera, and the number of camera positions and the corresponding model selection can be adjusted according to actual needs, as follows:

step S1, acquiring a first camera position image through a first camera position, tracking and acquiring a position of a shooting target in the first camera position image in real time;

step S2, based on the position of the shooting target, a close-up shooting composition of the shooting target is analyzed and calculated through image processing technology to obtain close-up shooting image coordinates of a second camera position;

step S3, the control module issues a tracking instruction to the second camera position based on the close-up shooting image coordinates;

step S4, based on the close-up shooting image coordinates, the second camera position carries out real-time tracking and shooting of the shooting target, and obtains a close-up shooting image of the shooting target.

It should be noted that the first camera position may be a gun-type camera, and the second machine position may be a dome camera.

Based on the preceding scheme, the position information of the shooting target in the first camera position image is position coordinate of the shooting target in the coordinate system of the first camera position image.

Specifically, the coordinate system of the first camera position image refers to a pixel coordinate system, and in addition to obtaining the position information of the shooting target in the first camera position image, it is also necessary to obtain the velocity information of the shooting target.

Based on the preceding scheme, in this embodiment, the image processing technology comprises optical flow algorithm;

Specifically, using the optical flow method, the position and velocity of the shooting target in the pixel coordinate system of the first camera position image can be accurately obtained, so as to obtain the action trajectory of the shooting target.

Specifically, before obtaining the position information of the shooting target in the first camera position image, it is necessary to perform target detection of the target appearing in the first camera position image, and only when the shooting target is recognized, the pixel position coordinates of the shooting target are analyzed, and the deep learning network is used to identify the shooting target, which can be realized by selecting deep learning algorithms such as FastRcnn and Yolo.

Specifically, the image processing technology includes the combination of the shooting composition analysis algorithm and the action reasoning algorithm to calculate and predict the close-up shooting composition; the shooting composition analysis algorithm is used to identify and locate the position of the shooting target in the first camera position image, and the deep learning network is used to analyze the image of the shooting target area in the first camera position image, and the close-up shooting composition with good composition quality is obtained; the action reasoning algorithm is used to predict the subsequent action of the shooting target, and the predicted next step or multi-step action data is transmitted to the shooting composition analysis algorithm to conduct close-up shooting composition analysis in advance, and the close-up shooting image coordinates of the second camera position are obtained; it should be noted that before the close-up shooting composition is analyzed, a large amount of composition data of the same-type image of the shooting target needs to be used to train the shooting composition analysis algorithm model, the analysis and calculation capability of the close-up shooting composition of the algorithm is enhanced, before the subsequent action of the shooting target is predicted, a large amount of shooting target same-type action data needs to be used to train the action reasoning algorithm model, and the action reasoning capability of the algorithm is enhanced. The action reasoning algorithm includes using Recurrent Neural Network (RNN), Attention Mechanism (Attention) and other models to predict the next action of the shooting target, using Generative Adversarial Network (GAN) and Variational Autoencoders (VAE) to generate and reason the actions of the shooting target in the image.

Specifically, the factors for determining whether the composition quality is good include various composition scale, color balance, focusing, light, background, and the like; wherein the composition scale includes, but is not limited to, Golden Ratio, Symmetric Composition, and Rule of Thirds Composition, and the color balance includes avoiding monotony in the image, cluttered colors, and selecting natural and soft tones, and the focusing includes whether the eyes or head of the shooting target can be clearly captured, and the light includes whether the brightness of the light is sufficient or overly bright, and the background includes whether the image background is cluttered to affect the subjectivity of the shooting target in the image.

Specifically, before obtaining the close-up shooting image coordinates of the second camera position, it is necessary to first obtain the close-up shooting image coordinates of the first camera position, and then convert the close-up shooting image coordinates of the first camera position into the close-up shooting image coordinates of the second camera position, that is, an alignment conversion between the coordinates of the first camera position and the second camera position, which can be used to calculate the coordinates with the self-calibration algorithm, including:

Based on deep learning algorithms such as Convolutional Neural Network (CNN), more representative feature points in the image are extracted, and the feature points are automatically learned through training data to improve the matching ability in case of image deformation and lighting changes.

The CNN-based feature extraction model was used to find the feature points in the images of the first camera position and second camera position and match them.

Motion estimation technology is used to obtain more accurate camera pose information by combining inertial measurement unit (IMU) or other sensor data;

according to the matching feature points and camera pose information, the coordinate alignment conversion relationship between the first camera position and the second camera position is calculated by using the least squares method, including the calculation of the rotation matrix and translation vector, so as to realize the coordinate alignment conversion.

Figure 2:
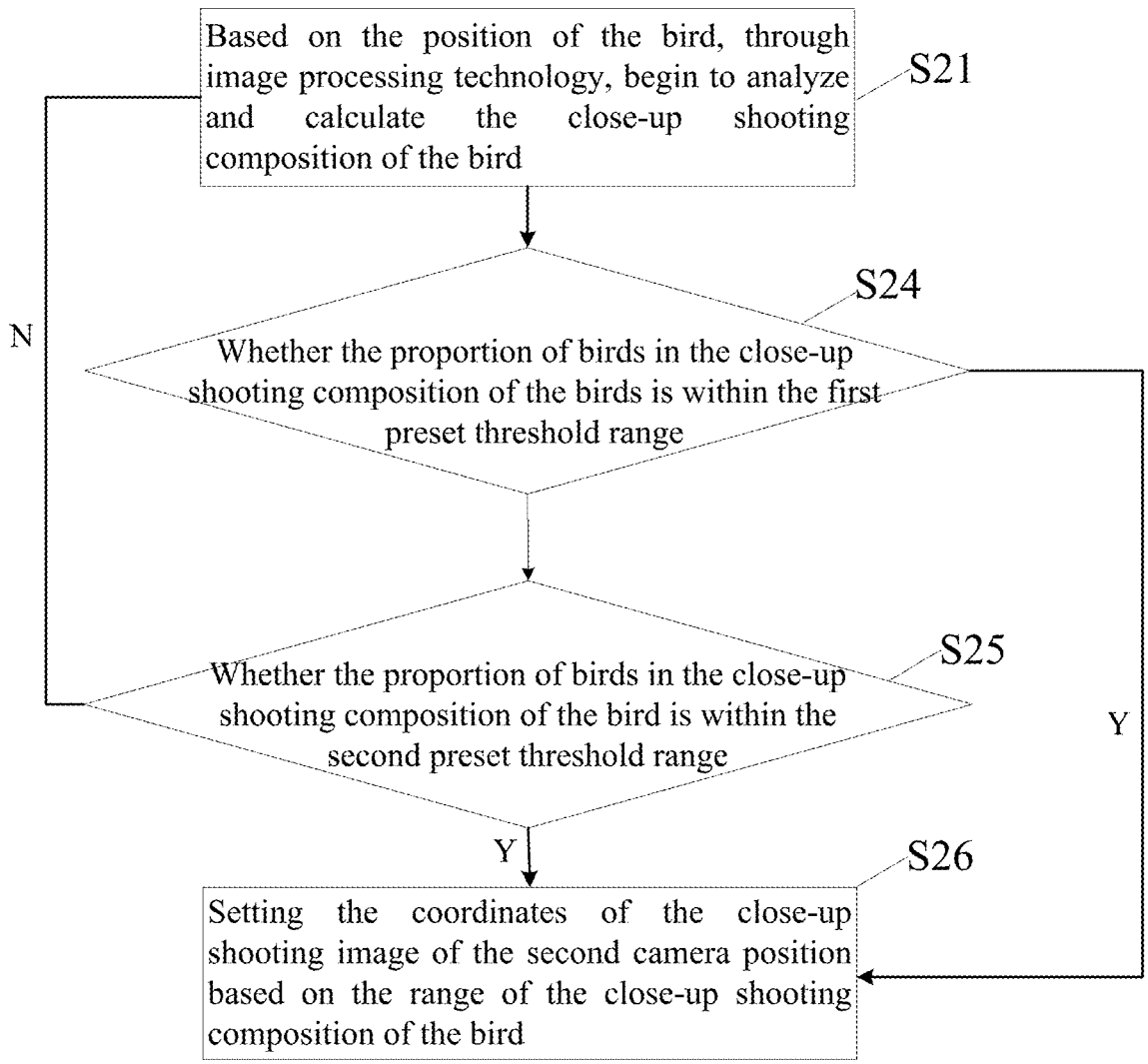
FIG. 2 shows a flowchart of a method for analyzing composition quality based on the image processing technology according to the embodiment.

Based on the preceding scheme, the shooting target is generally a wild animal, and close-up shooting of wild animals, including but not limited to birds, squirrels, and other wild animals; the following is an introduction to the selection of birds as the shooting target, and the analysis and calculation of the close-up shooting composition of the birds, as shown in FIG. 2, including:

step S21, based on the position of the bird in the first camera position, through image processing technology, begin to analyze and calculate the close-up shooting composition of the bird;

step S24, judge whether the proportion of birds in the close-up shooting composition of the birds is within the first preset threshold range, if yes, then the next step enters step S26, if not, then enters step S25;

step S25, judge whether the proportion of birds in the close-up shooting composition of the bird is within the second preset threshold range, if yes, then the next step enters step S26, if not, then return to step S21 to re-analyze and calculate the close-up shooting composition of birds;

step S26, setting the coordinates of the close-up shooting image of the second camera position based on the range of the close-up shooting composition of the bird.

Specifically, in this embodiment, the first preset threshold range is smaller than the second preset threshold range, that is, the second preset threshold range comprises the first preset threshold range.

Figure 3:
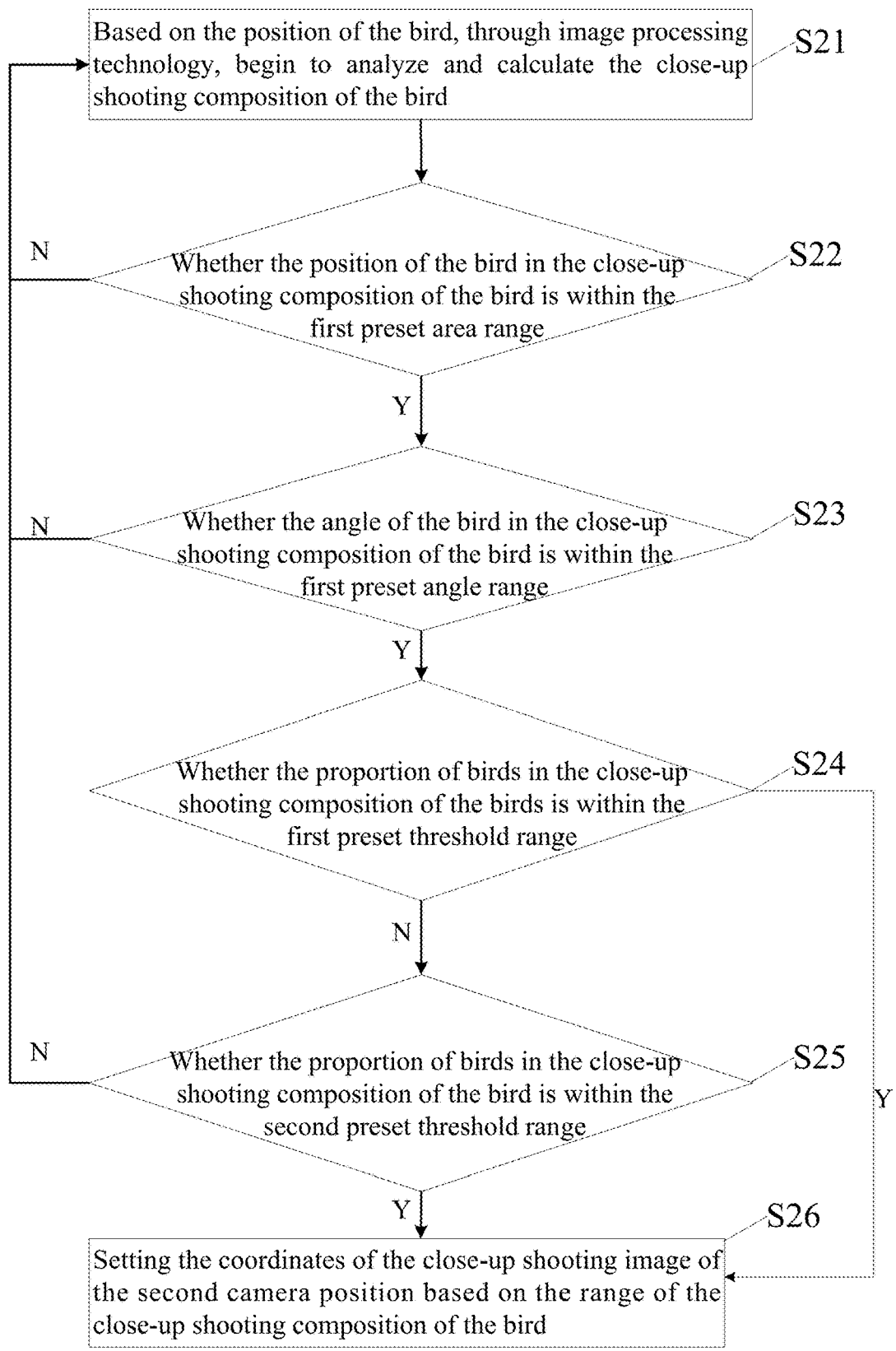
FIG. 3 shows a flowchart of another method for analyzing composition quality based on the image processing technology according to the embodiment.

Based on the preceding scheme, in addition to the solution in FIG. 2, the analysis and calculation of the close-up shooting composition of the bird may further select the solution as shown in FIG. 3, which specifically includes:

step S21, based on the position of the bird, through image processing technology, begin to analyze and calculate the close-up shooting composition of the bird;

step S22, judge whether the position of the bird in the close-up shooting composition of the bird is within the first preset area range, if yes, then the next step enters step S23, if not, then return to step S21 to re-analyze and calculate the close-up shooting composition of the bird;

step S23, judge whether the angle of the bird in the close-up shooting composition of the bird is within the first preset angle range, if yes, then the next step enters step S24, if not, then return to step S21 to analyze and calculate the close-up shooting composition of the bird again;

step S24, judge whether the proportion of birds in the close-up shooting composition of the birds is within the first preset threshold range, if yes, then the next step enters step S26, if not, then enters step S25;

step S25, judge whether the proportion of birds in the close-up shooting composition of the bird is within the second preset threshold range, if yes, then the next step enters step S26, if not, then return to step S21 to re-analyze and calculate the close-up shooting composition of birds;

step S26, setting the coordinates of the close-up shooting image of the second camera position based on the range of the close-up shooting composition of the bird.

Specifically, the first preset threshold range is determined according to the activity characteristics of the bird, when the bird is flying or other rapid movements, the first preset threshold range can be set to 10%~20%, the overall activity of the bird needs to be photographed, when the bird is stationary or the action amplitude is small, the speed is slow, the first preset threshold range can be set to 50%~85%, and the detailed behavior of the bird is mainly photographed. If the subject of the photograph is another animal, the first preset threshold range can be adjusted according to the characteristics of the animal.

Specifically, in the present embodiment, the range of the first preset area may be the middle area of 40%~50% of the close-up shooting composition, the first preset angle range includes the bird facing the camera either directly or sideways, rather than the tail facing the camera.

Figure 4:
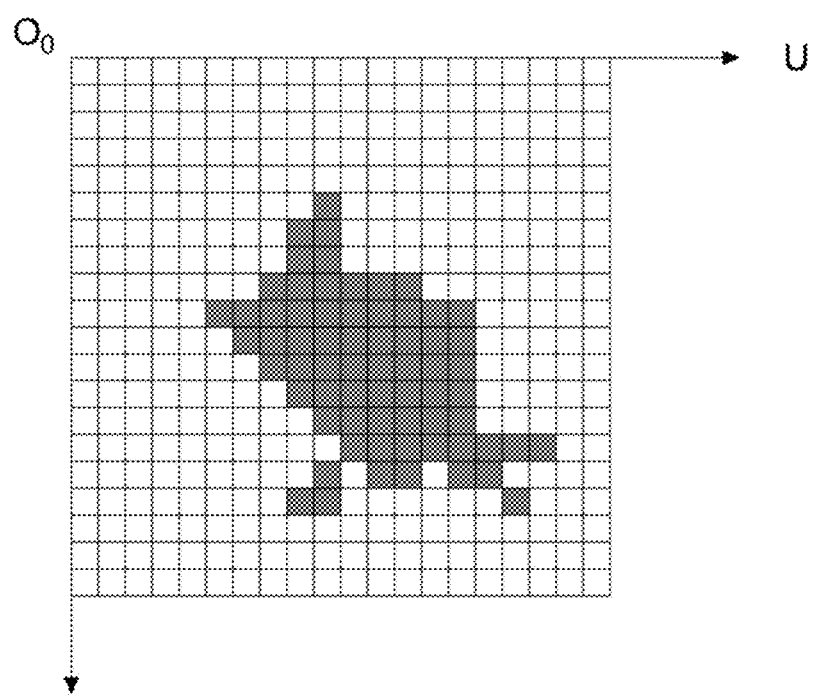
FIG. 4 shows a schematic diagram of analyzing the proportion of the shooting target in the close-up shooting composition based on the optical flow algorithm according to the embodiment.

Based on the preceding scheme, the real-time tracking and obtaining the position of the bird in the first camera position image in the step S1 specifically refers to the position coordinates of the bird in the pixel coordinate system of the first camera position image, as shown in the FIG. 4, after determining the position of the bird in the pixel coordinate system, the close-up shooting image composition is calculated and analyzed, and after selecting a composition range, the proportion of the bird in the close-up shooting composition of the bird is determined by the proportion of pixels, and then judge whether the proportion of birds meets the demand.

Figure 5:
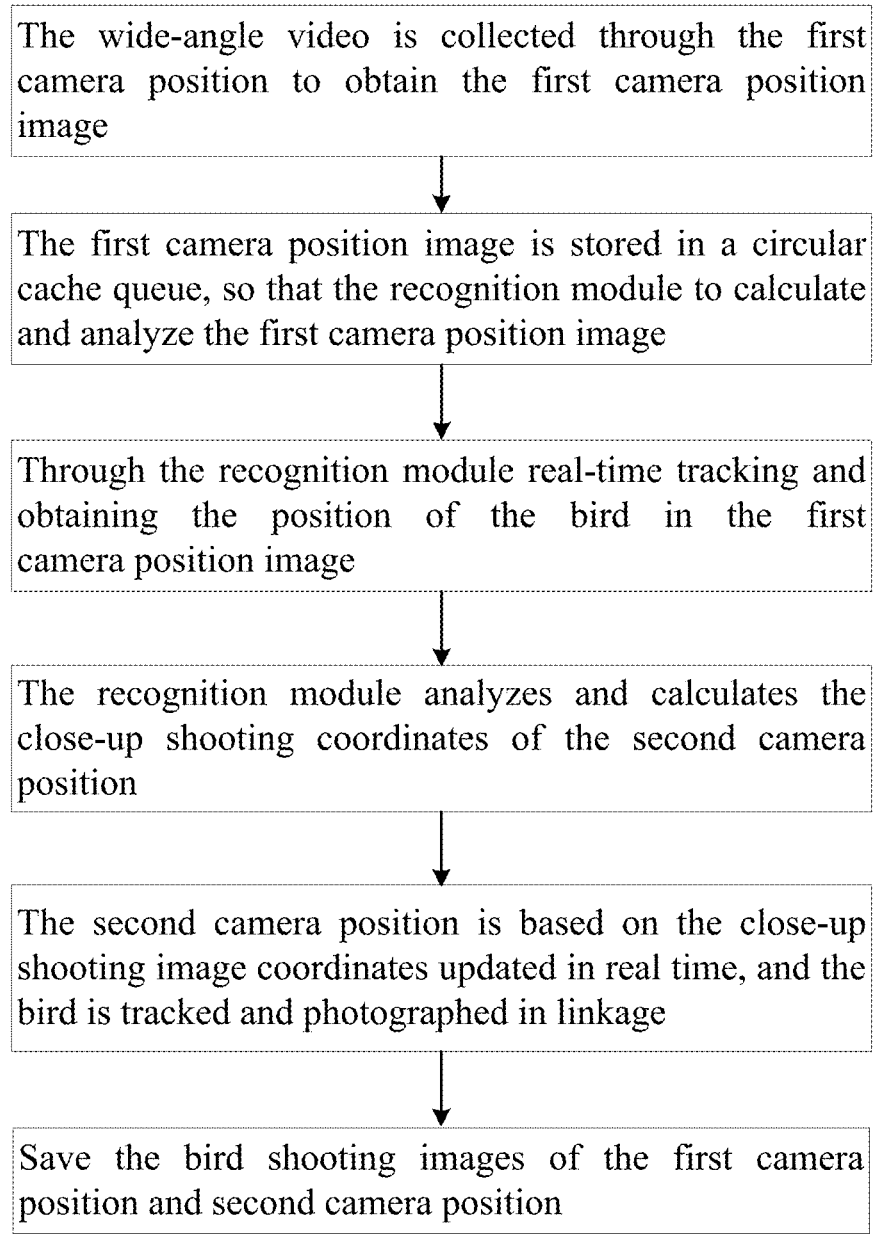
FIG. 5 shows a flowchart of another photographing method based on multi-camera linkage according to the embodiment.

Referring to FIG. 5, in more implementations, some adjustments can be made to the scheme details of the overall bird shooting method, and the specific bird shooting method comprises:

the wide-angle video is collected through the first camera position to obtain the first camera position image; in the present embodiment, a gun-type camera with a small camera size, low noise when shooting images, stable code flow, low power supply voltage, and working temperature suitable for outdoor conditions is selected as the first camera position, which is suitable for the bird shooting method;

the first camera position image is stored in a circular cache queue, so that the recognition module to calculate and analyze the first camera position image; the circular cache queue can effectively solve the access conflict of the same block of memory, so as to prevent waiting between threads and system errors when the first camera position shares the first camera position image, and improve system efficiency;

through the recognition module real-time tracking and obtaining the position of the bird in the first camera position image, comprising: obtaining the first camera image video sequence, bird target detection, obtaining the initial position of the bird in the image, invoking the optical flow algorithm to track the bird, judging whether to lose the bird, updating the target position of the bird; specifically, it is mainly to obtain the pixel position coordinates of the bird in the pixel coordinate system of the first camera position image, which can be completed by the optical flow algorithm, and before analyzing and obtaining the position coordinates of the bird, it is also necessary to carry out target detection on the target that appears in the first camera position image, and begin to analyze the pixel position coordinates of birds only when the bird is recognized, and deep learning networks such as FastRenn and Yolo are selected for bird target recognition;

the recognition module analyzes and calculates the close-up shooting coordinates of the second camera position; specifically, based on the image processing technology, the recognition module performs the second camera position close-up shooting image composition on the recognized position of the bird in the first camera position image, and analyzes and calculates the position coordinates of the composition satisfying the set threshold, and comprises the specific position coordinates of the bird in the composition;

the second camera position is based on the close-up shooting image coordinates updated in real time, and the bird is tracked and photographed in linkage; in this embodiment, a dome camera adapted to the selection of the first camera position is selected as the second camera position;

save the bird shooting images of the first camera position and second camera position;

it should be noted that in the present embodiment, the image processing technology comprises deep learning models such as convolutional neural network (CNN), and the specific image processing process comprises:

compositional features extracted from the close-up shooting composition, including but not limited to color, texture, edges, and other information in the image, for subsequent in-depth analysis;

based on the extracted image composition features, the image composition quality is judged, and the specific judgment factors include: the proportion of the bird in the image composition, the orientation angle of the bird in the image composition, and the matching degree of the bird with the background in the image composition. It should be noted that judging the quality of the composition is a real-time continuous process, and the quality of the composition is judged in real time according to the change of the bird's position;

the proportion analysis of the bird in the image composition is to analyze the pixel of the bird in the image by using the image segmentation technology in combination with the neural network, so as to determine the proportion of the bird in the composition; the matching degree of the bird with the background in the image composition is specifically the color and texture similarity between the bird and the background, and the color or texture is too similar, which will not be convenient for viewing the bird, and the matching degree of the color, texture and other features between the bird and the background is analyzed using the method of feature matching and comparison to assess the degree of integration and coordination between the bird and the background in the image composition; specifically, when the color similarity of the bird with the background in the image composition is lower than the first color preset similarity, and the similarity between the bird and the background texture in the image composition is lower than the first texture preset similarity, the proportion of the bird in the image composition can be determined.

Based on the preceding scheme, as shown in FIG. 6, a flowchart of the second camera position linked with the first camera position to track and rotate to shoot the bird, and when the second camera position is tracking and shooting the bird in real time, it needs to rotate and zoom according to the changes in the close-up shooting image coordinates to ensure that the captured close-up image conforms to the composition analyzed and calculated in the previous steps, in addition, in addition to zoom shooting and tracking rotation, some rotation actions may be added when rotating, such as some surrounding shooting actions, so that the shooting background is blurred and presented with fluidity, shooting a variety of effects.

It should be noted that this embodiment uses birds as the shooting target for introduction, but it should be thought that, in addition to birds and other wild animals such as squirrels, fish, bears, etc., the shooting method of this scheme can even be extended to shoot other creatures, there is no special limitation on the specific areas of application, and even the close-up shooting composition can be adjusted in some special ways according to the different movement characteristics of different animals and physical characteristics, such as birds fly fast, and when shooting images of bird activities, it is necessary to adjust the rotation speed of the dome camera tracking birds to shoot more accurate close-up images of birds; and then for shooting squirrels, squirrels are different in size from birds, the physical characteristics are also different from birds, and the proportion of squirrels in the shooting composition can be adjusted accordingly when shooting close-ups, and it does not necessarily have to be standardized to a specific value, etc., which should be included in this scheme.

In this embodiment, a different shooting method is realized by performing linkage shooting on the first camera position and the second camera position, wherein the first camera position acquires the first camera image, and tracks and acquires the position of the bird in the first camera image in real time; based on the position of the shooting target in the first camera position, the close-up shooting composition of the bird is analyzed and calculated to obtain the close-up shooting image coordinates of the second camera position, and the second camera position tracks the close-up image coordinates of the second camera in real time, and tracks and shoots the bird in real time to obtain the close-up shooting image of the bird. The present invention is different from existing methods of bird shooting, does not require a lot of manpower and time, can realize automated bird shooting, intelligent bird shooting, and through the first camera position wide-angle image and the second camera position close-up image of the bird, bird watching experience is better compared to the only wide-angle image, better stability than by manually controlling the camera to rotate the shooting, and more able to identify the bird watching image with better view effect for the user to view or edit.

Embodiment 2

Based on the shooting target method in embodiment 1, the embodiment of the present invention provides a camera based on multi-camera linkage, as shown in FIG. 7, wherein the setting of camera position is not limited to the first camera position and the second camera position, and can be added according to actual needs, comprising:

the first camera position is fixed wide-angle camera position, which is used to find the shooting frame of the shooting target;

the second camera position is the rotatable camera position, which is used to track close-up shooting of the shooting target;

the control module for controlling the camera position rotation of the second camera position;

the recognition module for determining close-up shooting image coordinates and rotation orientation of the second camera position based on image processing technology.

Based on the preceding scheme, the camera further comprises:
the storage module for storing images captured by the first camera position and the second camera position, and transmitting the images.

It should be noted that the first camera position can be selected as a gun-type camera, and the second camera position can be selected as a dome camera.

Specifically, in the present embodiment, the overall process of shooting a target image by the camera comprises:
the first camera position is used as a fixed camera position to capture the first camera image, which has a wide shooting range, and the shooting data is shared with the recognition module; the control module issues an analysis and calculation instruction to the recognition module, so that the recognition module analyzes and calculates the image of the target part in the picture captured by the first camera position;
according to an recognition scheme set by the system, the recognition module parses the coordinates of the close-up shooting range and the close-up shooting image coordinates of the shooting target according to the analyzed and calculated the close-up shooting composition range of the second camera position, and transmits the coordinates to the control module;
the control module issues a rotation control instruction to the rotatable second camera position according to the close-up shooting range coordinates and the coordinates of the shooting target in the close-up shooting image, so that the shooting image of the second camera position is always in the composition range of the close-up shooting image, and real-time tracking close-up shooting of the shooting target is achieved;
after the close-up shooting image of the shooting target is obtained by the second camera position, the control module sends a transmission image instruction to the storage module, and the images taken by the first camera position and the second camera position are stored in the storage module.

It should be noted that the shooting target is generally a wild animal, but is not specifically limited, and may even be another organism, and the following is described by using a bird as a shooting target.

Based on the preceding scheme, in this embodiment, as shown in FIG. 8, after obtaining a close-up shooting image of the bird, the close-up shooting image of the bird can be processed in the next step.

Specifically, the next step comprises:
the storage module transmits the close-up shooting image of the bird to the server of the cloud, and the server performs some editing operations on the close-up shooting image of the bird and stores the close-up shooting image of the bird;
the close-up shooting image of the bird after the editing operation is packaged and sent to the client for the user to check, and the user can view and study the captured bird through the image files.

Based on the preceding scheme, the editing operation includes but is not limited to: cropping, merging, deleting and modifying a close-up shooting image, deleting some images that are too similar, merging some short videos of birds of the same species or the same bird in moderation, adding some dynamic special effects to a picture that is too static for a long time in the long video, intercepting a picture with an excellent composition quality in the image as a picture, and adding music in the cloud music library to all videos as background music and storing separately the from the original video.

Based on the preceding scheme, the packaging and sending the close-up shooting image to the client may select whether the original close-up shooting image before the editing operation needs to be edited at the client, in case the server deletes the important close-up shooting image by mistake during the editing operation.

In this embodiment, the camera of the present disclosure may first identify and detect the bird shooting target in real time according to the first camera position image captured by the first camera position, analyze and calculate the close-up shooting image composition of the shooting target through the recognition module, find the composition meeting the set requirement, transmit the position coordinates of the composition in the first camera position image to the control module, and after the control module issues the rotation tracking shooting instruction to the second camera position, the second camera position performs automatic real-time close-up shooting on the bird to obtain the second camera position image, and the cameras for the first camera position and the second camera position linkage shooting, make shooting bird videos more efficient and less burdensome for the photographer.

Other embodiments of the present invention will be apparent to those skilled in the art from consideration of the specification and practice of the invention disclosed herein. This application is intended to cover any variations, uses, or adaptations of the invention following the general principles thereof and including such departures from the present invention as come within known or customary practice in the art. It is intended that the specification and examples be considered as exemplary only, with a true scope and spirit of the invention being indicated by the following claims. It will be appreciated that the present invention is not limited to the exact construction that has been described above and illustrated in the accompanying drawings, and that various modifications and changes may be made without departing from the scope thereof. It is intended that the scope of the invention be limited only by the appended claims.

What is claimed is:

1. A shooting method based on multi-camera linkage, wherein the method comprises:
acquiring a first camera position image through a first camera position, tracking and acquiring a position of a shooting target in the first camera position image in real time;
based on the position of the shooting target, a close-up shooting composition of the shooting target is analyzed and calculated through image processing technology to obtain close-up shooting image coordinates of a second camera position, wherein:
the close-up shooting composition of the shooting target is analyzed and calculated, comprising:
determining the proportion of the shooting target in the close-up shooting composition of the shooting target, if the proportion of the shooting target is within a first preset threshold range, setting the close-up shooting image coordinates of the second camera position based on a range of the close-up shooting composition of the shooting target;
if the proportion of the shooting target is not within the first preset threshold range, determine whether the proportion of the shooting target is within a second preset threshold range, and if the proportion of the shooting target is within the second preset threshold range, set the coordinates of the close-up shooting image of the second camera position based on the range of the close-up shooting composition of the shooting target;

based on the close-up shooting image coordinates, the second camera position carries out real-time tracking and shooting of the shooting target, and obtains a close-up shooting image of the shooting target.

2. The shooting method based on multi-camera linkage according to claim 1, wherein the second preset threshold range comprises the first preset threshold range.

3. A shooting method based on multi-camera linkage, wherein the method comprises:

acquiring a first camera position image through a first camera position, tracking and acquiring a position of a shooting target in the first camera position image in real time;

based on the position of the shooting target, a close-up shooting composition of the shooting target is analyzed and calculated through image processing technology to obtain close-up shooting image coordinates of a second camera position, wherein:

before determining the proportion of the shooting target in the close-up shooting composition of the shooting target, the shooting target needs to be determined the position and angle of the shooting target in the close-up shooting composition, including:

if the position of the shooting target in the close-up shooting composition of the shooting target is within a first preset area, then determining whether the angle of the shooting target in the close-up shooting composition of the shooting target is within a first preset angle range, and if so, carrying out the determining the proportion of the shooting target in the close-up shooting composition of the shooting target;

determining the proportion of the shooting target in the close-up shooting composition of the shooting target, if the proportion of the shooting target is within a first preset threshold range, setting the close-up shooting image coordinates of the second camera position based on a range of the close-up shooting composition of the shooting target;

based on the close-up shooting image coordinates, the second camera position carries out real-time tracking and shooting of the shooting target, and obtains a close-up shooting image of the shooting target.

4. The shooting method based on multi-camera linkage according to claim 3, wherein the first preset angle range comprises the angle at which the shooting target is facing the first camera position.

* * * * *